United States Patent
Babcock, Jr. et al.

[15] 3,676,527

[45] July 11, 1972

[54] PROCESS FOR PREPARATION OF HIGH IMPACT POLYSTYRENE

[72] Inventors: Lyndon R. Babcock, Jr., Chicago, Ill.; Dale A. Walker, Cherry Hill, N.J.

[73] Assignee: Shell Oil Company, New York, N.Y.

[22] Filed: Oct. 26, 1970

[21] Appl. No.: 84,225

Related U.S. Application Data

[63] Continuation-in-part of Ser. No. 643,031, June 2, 1967, abandoned.

[52] U.S. Cl. ............... 260/876 R, 260/29.7 UP, 260/876 B, 260/880 R, 260/880 B
[51] Int. Cl. ..................................... C08f 19/08, C08f 41/12
[58] Field of Search ..................................... 260/876 R, 880

[56] References Cited

UNITED STATES PATENTS

| | | | |
|---|---|---|---|
| 3,398,214 | 8/1968 | Roper et al. | 260/876 |
| 3,373,227 | 3/1968 | Finestone et al. | 260/880 |
| 3,448,175 | 6/1969 | Doak et al. | 260/880 |
| 3,488,743 | 1/1970 | Baer et al. | 260/880 |
| 3,330,786 | 7/1967 | Finestone et al. | 260/880 |

*Primary Examiner*—Samuel H. Blech
*Assistant Examiner*—Helen W. Roberts
*Attorney*—William H. Myers and Martin S. Baer

[57] ABSTRACT

An improved process for the preparation of high impact polystyrene which comprises: (a) polymerizing monomers from the group consisting of styrene, or mixtures thereof with minor amounts of acrylonitrile and/or lower alkyl acrylates to a conversion between about 30 and about 55 percent by heating said monomers between about 90 and 120°C, (b) separately interpolymerizing a diene rubber with styrene at a rate between 5 and 17%w weight per hour to a conversion between 13 and 30 percent, and (c) admixing the two streams and (d) non-catalytically polymerizing substantially all of the polymerizable monomers in the resulting mixture to form the high-impact polystyrene composition.

5 Claims, No Drawings

PROCESS FOR PREPARATION OF HIGH IMPACT POLYSTYRENE

This application is a continuation-in-part of copending application Ser. No. 643,031, filed June 2, 1967, now abandoned.

This invention relates to an improved process for the preparation of high impact polystyrene compositions in which the polystyrene has a controlled molecular weight, and in which a diene rubber is dispersed in an optimum manner.

The production of high impact polystyrenes is known in the art and generally comprises the simultaneous homopolymerization and interpolymerization of styrene effected by dispersing a rubber in styrene and polymerizing to form a composition in which the major component is homopolystyrene having dispersed therein a graft interpolymer of the rubber component comprised of grafts of relatively short polystyrene chains. The general preparation of high impact polystyrene has usually been a matter of compromise in that the simultaneous homo-and graft polymerizations resulted in rather inflexible product quality, since the optimum for each of these two components differ and could not be independently adjusted. The following properties must be considered in adjusting process conditions:

1. Tensile Strength and Modulus
2. Flexural Strength and Modulus
3. Compressive Strength and Modulus
4. Hardness
5. Stiffness (Rigidity)
6. Creep Resistance
7. Heat Deflection Temperature
8. Impact resistance One approach to this problem is described, for example in U.S. Pat. No. 3,398,214 to Roper et al., wherein polystyrene interpolymers are produced by blending a solution of a partially polymerized mono-vinyl aromatic compound with a prepolymer prepared by polymerizing an agitated mixture of a monovinyl-aromatic compound and a polybutadiene rubber, and completing the polymerization by heating the blend; said prepolymer being obtained by polymerizing to a conversion not greater than 10 percent. Higher conversions of prepolymer are shown to result in drastic loss of important properties such as impact strength. The relatively low conversion of prepolymer heretofore believed necessary has the disadvantage that often the conformity of the product leaves much to be desired.

One of the difficult problems in successful polymerization of styrene interpolymers is satisfactory control of temperature in the reaction mixture and removal of the substantial amount of heat liberated in the polymerization process, a particularly useful technique consists of maintaining in the polymerization zone a controlled small amount of water as described in U.S. Pat. No. 3,439,065 to Luftglass.

It is an object of the present invention to provide an improved process for the preparation of high impact form of polystyrene. It is a particular object of the invention to provide a process in which the interpolymer component and the homopolystyrene component may be varied at will. It is a further particular object of the invention to provide an elastomer interpolymer dispersed in a desirable form throughout the polystyrene matrix. It is a further object of the invention to provide an improved efficiency in the over-all polymerization process. Other objects will become apparent during the following detailed description of the invention.

SUMMARY OF THE INVENTION

Now, in accordance with the present invention, an improved process for the preparation of a high impact polystyrene composition is provided, the process comprising the following steps:

a. heating a solution of a conjugated diene elastomer in styrene at a temperature between about 110° and 140°C for a time sufficient to effect polymerization of from 13 to 30%w of the styrene at a relatively high rate of 5 to 17%w per hour;

b. separately heating polymerizable monomers which are either styrene or mixtures of styrene with 20 to 50%w of a monomer selected from the group consisting of an acrylonitrile, the lower alkyl esters of acrylic acid and lower alkyl esters of methacrylic acid at a relatively moderate polymerization temperature of 100°–120°C for a time sufficient to polymerize between about 30 and 55%w of the monomer;

c. admixing the products of steps a and b in weight ratios between about 4:6 and 6:4;

d. and non-catalytically polymerizing substantially all of the polymerizable monomers to form the high impact polystyrene composition.

Still in accordance with the present invention, close control over the individual steps outlined above is effected by injection of a minor amount (0.1-10%w based on the total reaction mixture) of a water at least in step (a). Still further improvements in control over the process are effected by splitting the finishing step into two separate operations as follows:

d 1. separately heating the admixture obtained in step (c) under reflux conditions in a stirred reactor at temperatures of 150°–180°C until 60–85% of the starting monomers have been polymerized;

d 2. thereafter passing the product so obtained to a separate unstirred reactor wherein polymerization is completed under adiabatic conditions.

The use of the parallel process described above results in a high degree of flexibility relative to optimizing the molecular weight and other characteristics of the homopolystyrene and of both molecular weight and degree of dispersion of the elastomeric interpolymer. Moreover, it permits a wide flexibility in the process for the production of a whole spectrum of products since a single homopolymeric prepolymer may be prepared and thereafter mixed with elastomeric interpolymers in varying percentages to produce a spectrum of products wherein the percent of elastomer can be varied or wherein the degree of prepolymerization and temperature thereof can be varied to optimize the final product relative to its intended use.

STYRENE PREPOLYMERIZATION

The major component of a high impact polystyrene composition is homopolymeric polystyrene. It has been found in the past that the strength, rigidity and other physical properties referred to hereinbefore require molecular weight control and molecular weight spread control. The limitations imposed by economic considerations require that a reaction rate be achieved that permits reasonably high throughput rates to be effected. However, if reaction rates are increased still further by raising a reaction (polymerization) rate, then molecular weight suffers and the strength and other physical properties of the final product are degraded.

Heretofore it has been a compromise in forming a high-impact polystyrene by simultaneous homo-and graft-polymerization to utilize reaction rates of such a tape that moderate average molecular weights of the homopolystyrene component resulted; but by such a compromise the ultimate physcial properties were not achieved. Consequently, the present invention involves the separate prepolymerization of polystyrene, either alone or in conjunction with a non-rubber modifying comonomer such as acrylonitrile, the lower alkyl esters of acrylic acid and of methacrylic acid such as ethyl acrylate, methyl methacrylate and the like; (the comonomer being present in proportions varying from very small percentages up to about 50 percent by weight, preferably between about 5 and 30 percent by weight), conducting the polymerization in such a way as to produce a relatively high molecular weight. Normally this will require the use of moderate polymerization temperatures in the order of 90°–120 C (in the upper part of the reactor) for a time sufficient to polymerize between about 30–55 weight percent of the starting monomers.

If the polystyrene prepolymerization step is carried out to a lesser degree, the resulting product has too low a viscosity to be readily mixed with the parallel prepolymer formed by interpolymerization of styrene with the rubber component which will be described hereinafter. Moreover, the finishing step wherein polymerization of the entire mixture is completed requires a mixture of a relatively high viscosity so as to minimize or eliminate the possibility of channeling portions of the feed thereto and consequent formation of a non-uniform final product. The use of the relatively moderate polymerization temperatures of 90°–120°C results in not only a relatively low rate of polymerization, but more importantly, results in a product having a weight average molecular weight usually in the order of between about 200,000 and about 300,000.

The polystyrene prepolymer reactor can be operated with agitation such as with a turbine, and preferably with automatic temperature control such as through jacket cooling. While thermal polymerization temperatures of 90°–120°C may be utilized for the preparation of the optimum average molecular weight, it is preferred that these temperatures be within the range of 95°–115°C. The homoprepolymerization is preferably effected to polymerize between about 35 and 50 weight percent of the starting monomer, so as to provide a relatively viscous high-conversion feed in the boiling zone used for the first finishing reaction. The time of reaction under these conditions will normally be between about 1 hour and 12 hours, but usually will be between 2 hours and 8 hours to achieve the optimum average molecular weight. In addition to jacket cooling or in place thereof, minor amounts of water may be injected to provide the evaporative cooling for temperature control.

PREPOLYMERIZATION OF RUBBER-STYRENE SOLUTIONS

The principal reason for the process of the present invention was to optimize the polymerization conditions for each of the components of the high-impact polystyrene composition. Thus the conditions which are found to be optimum for the preparation of the properly dispersed high-impact component are substantially different from those required for the production of the desired polystyrene homopolymer. Consequently, one of the aspects of the present invention was to find that relatively high reaction rates, i.e., at high temperatures, of the styrene solution of the elastomer component were required to provide the optimum dispersion of the elastomer component in a mixture of styrene and styrene polymer. The precise identification of the high-impact component after these prepolymerization has never been fully elucidated. However, it is generally understood in this art that any diene elastomer heated in the presence of a polymerizable monomer such as styrene forms what is referred to as an "interpolymer", by which is meant a diene elastomer backbone having pendant from it as side chains, relatively low-molecular-weight polymers of the monomers such as styrene. Consequently, wherever interpolymers are referred to in the present specification, this will be understood to be the tentative understanding of the product obtained by polymerization, of styrene in the presence of a diene elastomer.

Another function of the diene elastomer, other than providing flexibility, appears to be to occlude a certain amount, also undetermined of polystyrene, within the structure set up by the dispersed elastomer component. The present invention is concerned with the production of an optimum structure which presumably is effected by a particular dispersion of the elastomeric component throughout the main body of the homopolymeric polystyrene. If the particles of the elastomer are too large, then an undue amount of the rubber is required to effect satisfactory impact resistance. On the other hand, if long reaction times are utilized in the formation of the interpolymer and possibly of the polystyrene associated therewith, then degradation of the elastomer chain results and again an uneconomic amount of rubber is necessary to achieve a given degree of high-impact resistance. Consequently, this stage of the prepolymerization has as its principal objective the formation of an elastomeric interpolymer having an optimum degree of dispersion and a minimum amount of degradation.

It has been found that by heating a solution of at least 8 percent by weight (preferably in the range between about 10 and 14 percent by weight) of a conjugated diene elastomer in styrene at a temperature between about 110° and 140° to effect polymerization of at least 13 percent preferably 15 to 30 percent of the styrene that the reaction mixture undergoes phase inversion resulting in the emergence of a continuous phase of polystyrene in styrene monomer. Such phase inversion is well known to those skilled in the art.

Important advantages are obtained by operating at prepolymer conversion levels according to the invention. A significant advantage is that fouling of the prepolymerizer reactor which is experienced at lower conversion and temperatures, is essentially eliminated. When the process according to the invention is applied in a continuous manner, it is found that control of the process is greatly facilitated since upon contact with the high conversion prepolymer continuous phase, the feed solution of conjugated diene elastomer in styrene is precipitated to elastomer-containing particles which are then optimally dispersed in the agitated mixture. Another advantage is that the higher conversion in the prepolymerization step reduces the heat load in the final stages of polymerization and the tendency for the heat of polymerization to develop excessive, "runaway" temperatures with attendant degradation of the product and loss of properties. In other words better control of the process is achieved.

The dienes useful for the high-impact component of these compositions may be either homopolymers or copolymers of diene. Conjugated dienes such as butadiene, isoprene and dimethyl butadiene may be utilized, and in addition thereto, copolymers such as random copolymers of styrene with butadiene may be employed as well as block copolymers of such components. The block copolymers may be either those having two dissimilar blocks or three or more dissimilar blocks insofar as adjacent blocks are concerned. Typical species of these block copolymers include those having the general structure polybutadiene-polystyrene or more preferably those having the structure polystyrene-polybutadiene-polystyrene. Mixtures of these high-impact components may be employed such as particularly the mixtures of homopolymers, e.g., polybutadiene, with block copolymers, e.g., polybutadiene polystyrene. Tapered block copolymers may be employed as well as for the high-impact component. Thus a block copolymer having a butadiene block may be followed by a dissimilar block of styrene-butadiene wherein the ratio of the two monomer components changes through that block. Hydrogenated derivatives of the impact components also may be utilized.

Based on these considerations, it has been found that the optimum dispersion of the high-impact component by the relatively high polymerization temperatures and consequently fast reaction rates whereby the minimum of thermal degradation of the elastomer molecules takes place and the most effective type of dispersion of the particles of the elastomer component throughout the styrene and polystyrene present in this prepolymer are prepared.

More specifically, the prepolymer formed in this stage should comprise 8–18%w of the conjugated diene elastomer dispersed in styrene and heated at the relatively high polymerization temperature of 110°–140°C (near center and exit of reactor), preferably between about 115°–130°C, for a time sufficient to effect polymerization of between 13 and 30 weight percent of the starting styrene monomer, the rate of polystyrene formation being between about 5 and 17%w per hour. Still more preferably, the degree of polystyrene polymerization in this particular step is between 15 and 25 percent, and the rate of such polymerization is 8–12%w per hour. It will be noted that the temperature of polymerization and rate thereof may be substantially different from the temperature and rate effected in the formation of the homopolymer component, but also the extent of polymerization may be substantially different in the two prepolymers. In the first place, the prepolymer incorporating the interpolymer component is highly viscous, due to the presence of the elastomer and consequently engineering problems may be encountered if a greater degree of polymerization is effected in this particular stage. Moreover, it has been found that it is highly desirable to minimize the time of exposure of the prepolymer in this stage so as to minimize degradation thereof and also to optimize the dispersion of the particles of the interparticle throughout the mixture of interpolymer, homopolystyrene and styrene monomer.

Superior results are achieved when maintaining in the prepolymerization zone a small amount of water in the range from about 0.1 to about 10%w of water.

ADMIXING AND FINISHING POLYMERIZATION

While the solution of the interpolymer may be blended at any time subsequent to its formation with polystyrene prepolymer, it is preferred that the two solutions be blended immediately following their prepolymerization as described hereinbefore. The proportions in which the two prepolymers are blended will depend primarily upon the amount of elastomer component desired in the final product. This in turn will depend upon the precise treatment of the elastomer prepolymer insofar as its degree of dispersion is concerned, the proportion of the elastomer present in its prepolymer solution with styrene and polystyrene, and upon the molecular weight of the homoprepolymer and polystyrene itself. Dependent upon all of these individual factors with which experts in the art of high-impact polystyrene are generally familiar, the proportions of the two parallel prepolymer streams may be chosen, usually between about four to six parts of each, that is parts by weight. It is preferred that the two streams be mixed by in-line blending, usually aided by a rotational mixer or other blending device.

Following the preferred step of blending at this point, the final polymerization is effected either in a single reactor or, more preferably, in a two-stage finishing operation. In a single reactor it may be necessary to add diluent such as toluene or the like or at least utilize any water which may be present as a refluxing agent in the prepolymer operations. In this final stage of polymerization, where viscosities have increased through the prepolymerization period, water acts in a dual function, not only to regulate and control polymerization temperature but also in the act of reboiling, performs a viscosity-reduction function which is useful in the handling of these viscous mixtures.

If a single stage of finishing is utilized, the mixed prepolymers are preferably conducted through a tower reactor from top to bottom and exit as a viscous melt which is passed to a volatilizing extruder and usually chopped into pellets or other utilizable forms.

Preferably, as stated hereinbefore, the finishing polymerization is conducted in a series of stages. At least one of the first of these finishing stages is in a boiling reactor wherein up to about 60-85 percent of the starting monomeric styrene is converted into polymer at temperatures between about 150°-180 °C (measured near bottom of reactor). Preferably this initial stage of finishing causes polymerization of 70-80 percent of the total starting styrene monomer and refluxing is controlled by the presence of 1-5 percent by weight of water based on the total reaction mixture, the reaction being controlled at a temperature between about 155°-175°C.

Compared with a single finishing polymerization zone, the separation of a boiling zone from an adiabatic temperature zone following offers a number of important advantages: (1) Positive pressure can be used in the adiabatic reactor to maintain a uniform flow of effluent. (2) Process diluents are not required. (3) Residual monomer content is lowered as a result of improved flow profile. (4) Quality of the gel phase is better controlled because of more uniform flow through the high-temperature finishing section. (5) Control of molecular weight and molecular weight distribution can be improved because of positive temperature control in all reaction stages. (6) Capital savings can be expected since effluent from the stirred boiling zone is finished in a simple pipeline reactor instead of a vertical tower with complex internals.

Following the reflux boiling zone in which the principal part of the finishing polymerization occurs, the polymerization mixture is then passed to a finishing zone operated under adiabatic non-reflux conditions. This preferably takes any convenient form of pipe which can be termed a pipe reactor. The finishing pipe reactor may simple be a hot oil-traced pipe connected the boiling zone with the extruder. Thus, in the pipe, polymerization proceeds adiabatically to substantially complete polymerization of monomers up to at least about 97 percent conversion of the original monomers to polymer. Due to separation of the boiling zone from the pipe reactor, difficulties previously experienced in a combined finishing equipment are obviated in that there is no plunging of low-conversion materials to the bottom of any finishing tower due to conversion, density, and viscosity gradients. Such disadvantages in previous processes gave rise to gross temperature changes and caused extruder surging with resultant poor product quality. Isolation of the boiling zone from this finishing pipe reactor prevents this plunging of low-conversion materials and a gear pump may be utilized to deliver a smooth flow of finished high-impact polymer composition through the pipe to the extruder. The flow profile in the pipe can be further improved if desired by heating the walls above the internal temperature, thus lowering the viscosity of the mixture at the walls. Because of poor heat transfer, wall temperatures have little effect upon the bulk internal temperatures.

Another advantage of the process of the invention is in its effective use of diene elastomer as a high-impact component which enables the reduction of the amount necessary to achieve a given impact strength. This in turn is a manufacturing cost savings advantage. The process of the invention enables this reduction by the formation of both an optimum microstructure and matrix molecular weight.

The short residence times in the formation of the interpolymer in the high-temperature prepolymer stage results in a large volume of dispersed phase as indicated by the gel/rubber content ratio. The high-temperature finishing pipe reactor does not result in an unduly high degree of cross-linking.

EXAMPLE 1

For comparative purposes, a series of products were obtained and a single product was formed by a prior art process for comparison. The prior art process comprised the formation of a solution of diene rubber in monomeric styrene and heating the entire mixture at about 105°C for about either hours to form a prepolymer which is then sent to a finishing toward where the substantially complete polymerization of styrene is formed and the product extruded as high-impact polystyrene. The process of the present invention was utilized for comparison with this to show the reduction in rubber requirement for obtaining a product having essentially the same high-impact strength characteristics. The table which follows illustrates two typical runs obtained under the con-ditions of the process of this invention and the properties of the products so obtained.

TABLE

Process and Product Data

| Sample | A | B | C(Non-parallel Prepolymerization) |
|---|---|---|---|
| RUBBER PREPOL. | | | |
| Conversion, % | 15 | 13 | 25 |
| Residence Time, hr | 2.5 | 2.6 | 14.0 |
| Temperature, °C | 111 | 115 | 102 |
| Rubber Content, % | 12 | 12 | 8.0 |

| | | | |
|---|---|---|---|
| Reaction Rate, % hr | 6.0 | 5.0 | 1.8 |
| HOMO. PREPOL. | | | |
| Conversion, % | 40.5 | 38 | None |
| Residence Time, hr | 16.3 | 15.2 | — |
| Temperature, °C | 99 | 99 | — |
| Reaction Rate, %/hr | 2.5 | 2.5 | — |
| Nettco RPM | 150 | 0 | — |
| BOILING ZONE | | | |
| Conversion (Exit), % | ≈85% | ≈85% | — |
| Residence Time, hr | 4.2 | 4.0 | — |
| Temperature, °C | 168 | 170 | — |
| Agitation, rpm | 1 ½ | 2 | — |
| FIN. PIPE | | | |
| Conversion (Exit), % | ≈97 | ≈97 | — |
| Residence Time, hr | | | |
| Temperature (mid pt.), °C | 176 | 175 | — |
| Production, lb/hr | 11.8 | 11.2 | — |
| Post-Devolatilization | No | Yes | — |
| PROD. PROP. | | | |
| Falling Weight Impact Strength | | | |
| Extruded Sheet, 0.120 inch | | | |
| 73°F | 275 | 295 | 240–300 |
| 0°F | 310 | 270 | |
| Izod, Impact Strength Comp. | — | 1.3 | |
| Izod, Sheet 73°F | 1.0 | 1.2 | 0.96–1.06 |
| Sheet 0°F | 0.86 | | |
| Tensile at Yield, psi | 3700 | 3100 | 3,300 |
| Ultimate Tensile, psi × $10^{-3}$ | 2800 | 3000 | 2,800 |
| Ultimate Elongation, % | 24 | 39 | 11–30 |
| Flex Strength, psi | 6300 | — | — |
| Flex Modulus, psi × $10^{-5}$ | 3.4 | — | — |
| Hardness, Rockwell M | 12 | 10 | |
| Heat Distortion, Temp., °F | 175 | 190 | — |
| Melt Index, G (ASTM) | 4.6 | 2.0 | 1.7–3.6 |
| DSV, dl/g | 0.67 | 0.77 | 0.71–0.75 |
| MeOH Solubles, %w | 2.9 | — | |
| Gel Content, %w | 15.5 | 17.9 | 14–19 |
| Swell Index | 8.7 | 9.0 | 8.4–10.1 |
| Ave. particle size, microns | — | 2.2 | |
| Glass Trans., Temp., °C | −90.0 | −85.0 | |
| Rubber Content, %w, by IR | 6.4 | 6.2 | 8.0–9.0 |

EXAMPLE II

PARALLEL PREPOLYMERIZATION APPLIED TO HIGH IMPACT ACRYLONITRILE-STYRENE COPOLYMERS

In a variation of the process of the invention, a high impact polymer having an acrylonitrile component was prepared as follows:

| | Rubber-containing Polymer | Acrylonitrile-containing Prepolymer |
|---|---|---|
| | Styrene, 88%w Polybutadiene, 12%w | Styrene, 77.7%w Acrylonitrile, 22.2%w |
| Temperature of Polymerization, °C | 113 | 100 |
| Agitation Rate, rpm | 60 | 60 |
| Average Polymerization Rate, %/hr | 8 | 2.3 |
| Prepolymer Conversion | 25 | 25 |

The polymers were blended in equal amounts and the polymerization finished at a programmed temperature of 10°/hr from 140 to 220°C. The material was devolatilized by milling for 5 minutes at 170°C.

Physical Properties
(Compression molded)   Chemical Properties

| | |
|---|---|
| Falling weight impact Strength (Gardner) ft-lb/in. 22 | Bound ACN, %w 4.0 |
| Izod impact resistance of notch 1.6 | Gel content, %w 23.9 |
| Tensile strength at | Swell Index 9.7 |
| yield, psi 2240 | DSV, dl/g 0.62 |
| Ultimate tensile strength, psi 2760 | Residual monomer, %w 0.03 |
| Elongation, % 10.8 | Chemical resistance, Critical strain* in n-Heptane, in/in. 0.0032 |

*The level of strain (stress) below which stress-cracking will not occur. Typical values for high impact polystyrene are 0.001–0.0015.

WE CLAIM AS OUR INVENTION:

1. A process for producing high-impact polystyrene comprising:
   a. heating a solution of 8 to 18 wt % of a conjugated diene elastomer in styrene at a temperature between about 110° and about 140°C for a time sufficient to effect polymerization of from 15 to 30 wt % of the styrene at a rate between about 5 and 17 wt % per hour;
   b. separately heating polymerizable monomers of the group consisting of styrene and mixtures thereof with from 5 to 30 wt % of monomer selected from lower alkyl esters of acrylic acid, lower alkyl esters of methacrylic acid, and an acrylonitrile, at a temperature between about 90°and about 120°C for a time sufficient to polymerize between about 30 and about 55 wt % of the monomer;
   c. admixing the products of steps (a) and (b) in weight ratios between about 4:6 and 6:4;
   d. and non-catalytically bulk polymerizing substantially all of the polymerizable monomers in the resulting mixture to form the high-impact polystyrene composition.

2. A process according to claim 1 wherein 0.1–10 wt % of water is present at least in step (a), whereby heat of reaction of the polymerizable monomer is absorbed in evaporation of the water.

3. A process according to claim 1 wherein step (d) is conducted in two physically separated stages comprising:
   d1. continuing the polymerization of the mixture formed in step (c) up to 60–85 percent polymerization of starting monomers in a stirred reactor under reflux at temperatures within the range of 150°–180°C;
   d2. and thereafter passing the product so obtained to a separate unstirred reactor wherein polymerization is completed under adiabatic conditions.

4. A process according to claim 1 wherein the polymerizable monomer is styrene.

5. A process for producing high impact polystyrene which comprises:
   a. heating a solution of 8–14 wt % of an elastomeric polybutadiene in styrene at a temperature in the range between about 120° to about 130°C with mechanical mixing for a time sufficient to polymerize 15–30 wt % of the styrene at a rate of 10–15 wt per hour;
   b. separately homopolymerizing styrene at a temperature of 90°–120 C for a time sufficient to polymerize 35–50 percent of the styrene;
   c. admixing the products of (a) and (b) in proportions such as to provide 4–8 wt % of polybutadiene;
   d1. continuing polymerization until 70–80% of the styrene has been polymerized under reflux in the presence of 1–5 wt % of water in a stirred reactor at temperatures of about 150°–180°C;
   d2. and in thereafter substantially completely polymerizing remaining styrene under quiescent adiabatic conditions in a separate reactor.

* * * * *